United States Patent [19]

Maier et al.

[11] Patent Number: 4,537,424
[45] Date of Patent: Aug. 27, 1985

[54] CLEANING APPARATUS

[75] Inventors: Siegfried Maier, Leinfelden-Echterdingen, Fed. Rep. of Germany; Eckart Albrecht, Romanshorn, Switzerland

[73] Assignee: Düpro AG, Romanshorn, Switzerland

[21] Appl. No.: 431,605

[22] Filed: Sep. 30, 1982

[30] Foreign Application Priority Data

Feb. 23, 1982 [DE] Fed. Rep. of Germany ....... 3206464

[51] Int. Cl.³ ................................ A47L 9/24
[52] U.S. Cl. ......................... 285/7; 15/377; 285/275; 285/278; 285/280; 285/261; 285/264
[58] Field of Search ................ 285/7, 264, 261, 280, 285/278, 275; 15/377

[56] References Cited

U.S. PATENT DOCUMENTS 1,940,244 12/1933 Carlstedt ............................. 285/7 X
3,184,775 5/1965 Downey ............................ 15/377 X

FOREIGN PATENT DOCUMENTS

641935 5/1928 France ................................. 285/261
340969 10/1959 Switzerland ......................... 15/377

Primary Examiner—Cornelius J. Husar
Assistant Examiner—Eric S. Katz
Attorney, Agent, or Firm—Becker & Becker

[57] ABSTRACT

A cleaning apparatus, especially a suction nozzle, for a vacuum cleaner. The apparatus has a joint pan connected with an apparatus housing, and a joint head connected with an apparatus connecting piece for a handle of the vacuum cleaner. The joint parts are parts of a joint, especially a tilting joint, and delimit a gap of movement of the joint. At least one of the joint parts is a part which can be detached from the apparatus part respectively associated therewith, which detachable part is provided at least partially with a fiber packing which projects into the gap of movement. The fiber packing includes closely packed fibers which are arranged at least substantially at right angles on an associated supporting surface of the joint part.

11 Claims, 8 Drawing Figures

CLEANING APPARATUS

BACKGROUND OF THE INVENTION

1. Field of the Invention

The present invention relates to a cleaning apparatus, especially a suction nozzle of a vacuum cleaner for cleaning floors, etc., a joint pan is connected with an apparatus housing, a joint head is connected with an apparatus connecting piece for a tubular guiding handle of the vacuum cleaner. The joint parts are a portion of a linkage, especially of a tilting joint, and delimit a gap of movement of the linkage or joint.

2. Description of the Prior Art

A known cleaning apparatus of this type is a suction nozzle which is connected with the vacuum cleaner via the handle, which is constructed as a suction tube or vacuum pipe. The joint or pivot connection between the joint pan and the joint head is subjected to a continuous oscillating pivot movement when cleaning a floor due to the back and forth movements of the handle. In order to guarantee the desired easy action or motion of the joint connection, an appropriately sized movement gap is provided between opposite sliding surfaces of the joint pan and the joint head. The gap of movement is exposed to a dust air stream which enters from the floor in the direction of the vacuum cleaner. Frequently hard dirt particles, such as sand granules, rock particles, or similar particles reach the gap of movement. These dirt particles can then settle or wedge in the movement gap between the sliding surfaces, as a result of which the mobility of the joint connection during pivoting of the joint head relative to the joint pan can be impeded or even blocked. Furthermore, the joint head and the connecting piece are made in one piece, so that these parts are relatively complicated parts.

It is an object of the present invention to improve a cleaning apparatus of this type in such a way that a settling of dirt particles in the gap of movement of the joint can be avoided in a simple and straightforward manner.

This object, and other objects and advantages of the present invention, will appear more clearly from the following specification in connection with the accompanying drawings.

DESCRIPTION OF THE PREFERRED EMBODIMENT

The cleaning apparatus of the present invention is characterized primarily in that at least one of the joint parts is a part which can be detached from the apparatus part respectively associated therewith. This detachable part is provided at least partially with a fiber packing which projects into the movement gap and is provided with closely packed fibers which are disposed at least nearly at right angles on an associated support surface of the joint part.

The intrusion and wedging of dirt particles in the gap of movement can be prevented with the fiber packing, so that the joint connection retains the necessary easy action or motion. The separate joint part has a considerably simpler geometric configuration than does the one-piece construction with the associated apparatus part. The fiber packing can be provided without special expenditure of work, and at low cost, in the gap of movement of the joint. The fiber packing can be applied to the joint part especially easily by means of an electrostatic flocking process. This process would be quite expensive with complicated joint parts. With the latter, before applying the adhesive layer necessary for flocking, those surfaces that are to remain free of fiber packing would have to be masked or covered by hand with a protective foil. This covering, and the subsequent removal thereof, requires a considerable expenditure of work, and hence cost. Also, the conventional spraying procedures for applying the adhesive would not be expedient, because hygienic work and safety regulations have to be observed, which requires additional expensive devices.

Since a separate joint part is provided for the dust protection with the arrangement according to the present invention, the adhesive layer and the fiber packing can be easily applied with nominal expenditure of work and time, and without special safety or precautionary measures, in an electrostatic flocking process. The joint part only needs to be dipped in a highly fluid adhesive mass, whereby a uniform thin adhesive layer results on the surface thereof. Subsequently, the fiber packing is applied by flocking in an electrostatic process. The layering or coating is possible in a semiautomatic or even in a fully automatic finishing procedure.

According to another embodiment of the present invention, the gap of movement between a bearing recess and a bearing part of a joint is sealed via a ring. The is provided with a fiber packing. The simple shape of the ring likewise makes it possible to apply the fiber packing simply and quickly in an electrostatic flocking process. The ring can be provided with an adhesive layer and the fiber packing in the manner previously described.

According to further specific features of the present invention, the joint part may be constructed having a drum shape.

The joint part may have an insert opening which extends transverse to the axis of the joint part, which insert opening is formed by openings of a cylindrical wall of the joint part, which openings extend in the direction of the axis of the joint part and approximately over the entire length thereof. Longitudinal edges of one of the openings of the joint part may project into associated arresting grooves of a connector part of the connecting piece.

The joint part may be an insert piece of the joint pan, and includes the joint head.

The cleaning apparatus may be provided with a pivotally mounted connecting piece for a handle of the vacuum cleaner, with a bearing part of the connecting piece projecting into a bearing recess of a joint and delimiting therewith a gap of movement; a ring having a fiber packing of densely packed fibers, which are at least nearly at right angles to a supporting surface of the ring, is provided in the bearing recess; the ring is located ahead of the bearing part, as seen from the apparatus housing in the direction toward the connecting piece. The bearing part is a radially outwardly projecting edge of the connecting piece.

The bearing recess may be an annular groove of a sleeve-shaped intermediate piece which is connected with the joint head of a tilting joint in the manner of a socket.

The ring and the bearing part may be held axially unshiftable in the annular groove. The ring is radially stressed in the annular groove and is constructed as an open ring of elastic material.

The connecting piece, in the region of the bearing part, may have at least one, preferably several, grooves which extend approximately axially and are spaced apart one after the other in the circumferential direction.

The joint part and the ring may be surrounded on all sides by the fiber packings, which are rigidly connected, for example adhesively, with the joint part and the ring.

Referring now to the drawings in detail, the cleaning apparatus or devices illustrated are suction nozzles which are jointedly connected with a tubular guiding handle 13 of a vacuum cleaner. These suction nozzles are moved back and forth with the guiding handle on the surface to be cleaned in order to clean floors, carpets, and the like. The handle 13 is constructed as a suction tube, and establishes the air-conducting connection between the suction nozzle and a non-illustrated dust filter and dust collecting system of the vacuum cleaner. In order to assure contact of the suction nozzle during back and forth movements and when cleaning under pieces of furniture, a tilting joint 4 having a sleeve-like connecting piece 9 or an intermediate piece 9a is provided between the apparatus housing 1 of the suction nozzle and the handle 13. The sleeves 9, 9a are detachably connected with the handle 13, and are undetachably, though jointedly, connected with the suction nozzle.

Figure 1:
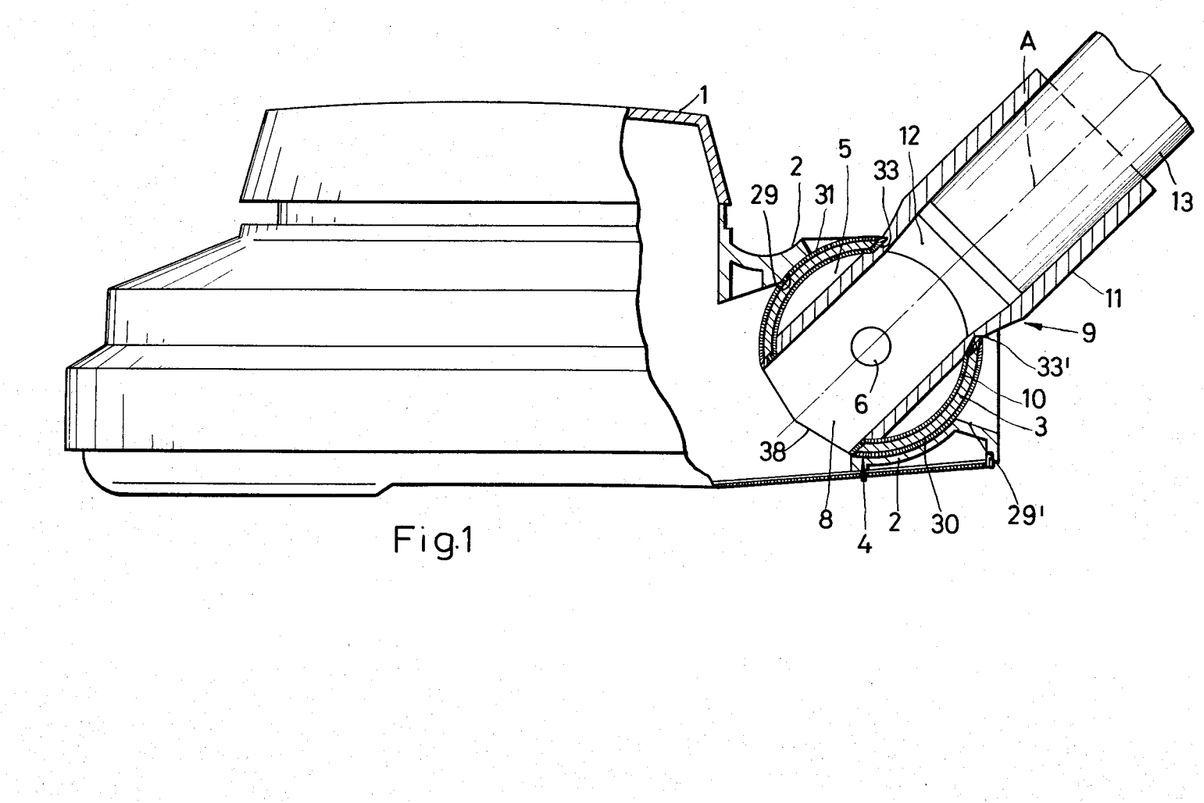
FIG. 1 shows in a fragmentary elevational view which is partially axially sectioned shows a portion of one embodiment of an apparatus according to the present invention with an apparatus housing and a tubular guiding handle of a vacuum cleaner which are connected with each other via a tilting joint.
Figure 6:
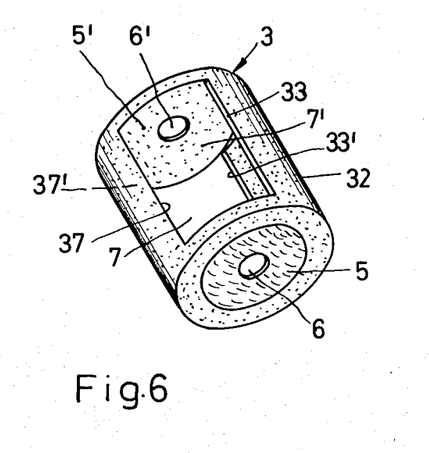
FIG. 6 shows the joint part of FIG. 5 in a perspective illustration.

The sleeve 9 (FIG. 1) is provided with a joint head 3 which is mounted in a shell-shaped joint pan 2 of the apparatus housing 1, and is pivotable about an axis which extends in the longitudinal direction of the suction nozzle, i.e., transverse to the working direction thereof. The tilting or pivot range of the joint head 3 and of the sleeve 9, 9a connected therewith, and hence of the handle 13, extends from a nearly horizontal position to a nearly vertical or upright position. With the embodiment according to FIG. 2, an additional rotational movement of approximately 360° is possible in addition to this tilting or pivot range of approximately 90° via a swivel joint 14. The handling of the suction nozzle, and hence the cleaning with the nozzle, especially at poorly accessible locations, is considerably facilitated by means of this swivel joint 14. The swivel joint 14 is located between the sleeve 9a and a connecting piece 28 which receives the handle 13. In order to make possible the easy action or motion of the tilting joint 4 between the joint pan 2 (which is rigidly connected with the apparatus housing 1) and the joint head 3, as desired for an easy handling of the suction nozzle, a movement gap 31 of constant width is provided between the joint parts, i.e., between their adjacent sliding surfaces 29, 29', and 30 (FIG. 1). This gap 31 lies in the direction of flow of the air flowing from the suction nozzle through the sleeve 9, 9a and the handle 13 into the dust filter system of the vacuum cleaner, so that dirt particles can easily enter the gap and settle between the opposing sliding surfaces, where they can impede the relative movement between the sliding surfaces. In order to avoid this, a dirt-repelling elastic fiber packing 10 is provided in the gap 31. The packing comprises fibers which are densely packed and are at the right angles or at least substantially at right angles to the supporting or bearing surface 32 (FIG. 6). The supporting or bearing surface 32 is formed by a cylindrical wall which is provided with an adhesive layer.

Figure 4:
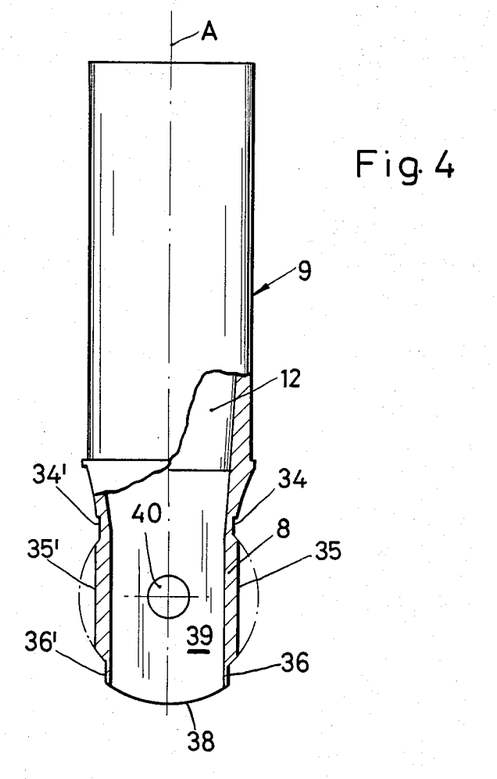
FIG. 4 shows a connecting piece of the apparatus according to FIG. 1, partially in axial section and partially in an elevational view.
Figure 5:
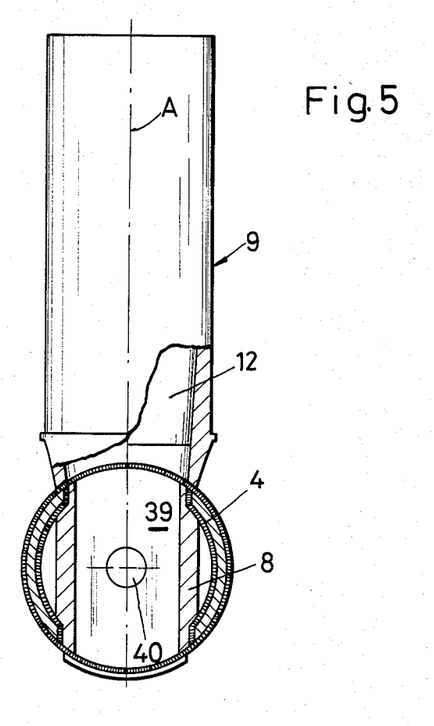
FIG. 5 shows the connecting piece of FIG. 4 with a joint part mounted thereon, and is illustrated partially in an axial section and partially in an elevational view.

The joint head 3 is constructed as a hollow cylinder with a circular cross section (FIG. 6), and can be mass produced by deep drawing or in an injection molding procedure of thermoplastic synthetic material as a simple, inexpensive structural part. The length and diameter thereof are matched or adapted extensively to the partially circular sliding surfaces 29, 29', as well as to that length of the joint pan 2 measured parallel to the pivot axis, so that the joint head 3 in the assembled position according to FIG. 1 is arranged concentrically in the joint pan 2 with the mentioned movement gap 31. The end faces thereof are respectively closed-off via a disc 5, 5' having a central bore 6, 6' for receiving the pivot shaft of the tilting joint. The cylindrical wall 32 of the joint head 3 has two rectangular openings or breakthroughs 7, 7' which are aligned with each other and extend transverse to the cylinder axis. Together these openings or break-throughs form an insert opening 7, 7' for a connector part 8 of the sleeve 9. The openings 7 and 7' essentially extend over the entire length of the joint head 3; their width extends over approximately a peripheral angle of 80°. The connector part 8, which likewise has a rectangular cross section, is positively connected with the joint head 3 in the associated openings 7 and 7', whereby the joint head 3 is held axially unshiftable on the connector part 8 by an arresting connection. In this arresting position, two longitudinal edges 33 and 33' of one of the openings 7' lie positively in associated arresting grooves 34 and 34' of the connector part 8. These arresting grooves 34 and 34' (FIG. 4) extend at right angles to the longitudinal axis A of the sleeve 9, and are located on the wide sides 35 and 35' thereof. In this arresting position (FIG. 5), the connector part 8 additionally is supported on the inner surfaces of longitudinal edges 37 and 37' (FIG. 6) of the other opening 7 via the shoulder surfaces 36 and 36' which extend over the entire width of the wide sides 35 and 35'. The shoulder surfaces 36 and 36' are parallel to the grooves 34 and 34', and are spaced from a free end face 38 of the connector part 8 in such a way that this end face 38 does not project appreciably out of the joint head 3 beyond the associated opening. Bores 40 respectively provided in the narrow sides 39 of the connector part 8; these bores are aligned with the bores 6, 6' of the discs 5 in the arrested connection of the joint head 3.

On that side of the grooves 34 and 34' which faces away from the joint head 3, the sleeve 9 merges into a receiving part 11, that has a conical opening 12 into which the handle 13 is inserted.

Before fastening the joint head 3 onto the connector part 8, the former is provided on all sides and completely with the fiber packing 10, the fibers of which completely fill the gap 31 in the mounted state, thus guaranteeing a secure and reliable sealing-off of the gap against intrusion of dirt particles. To fasten the fibers, an adhesive layer is applied to the joint head 3 by dipping the latter into a highly fluid adhesive mass which is then provided with the fibers via electrostatic flocking (FIG. 6).

Figure 2:
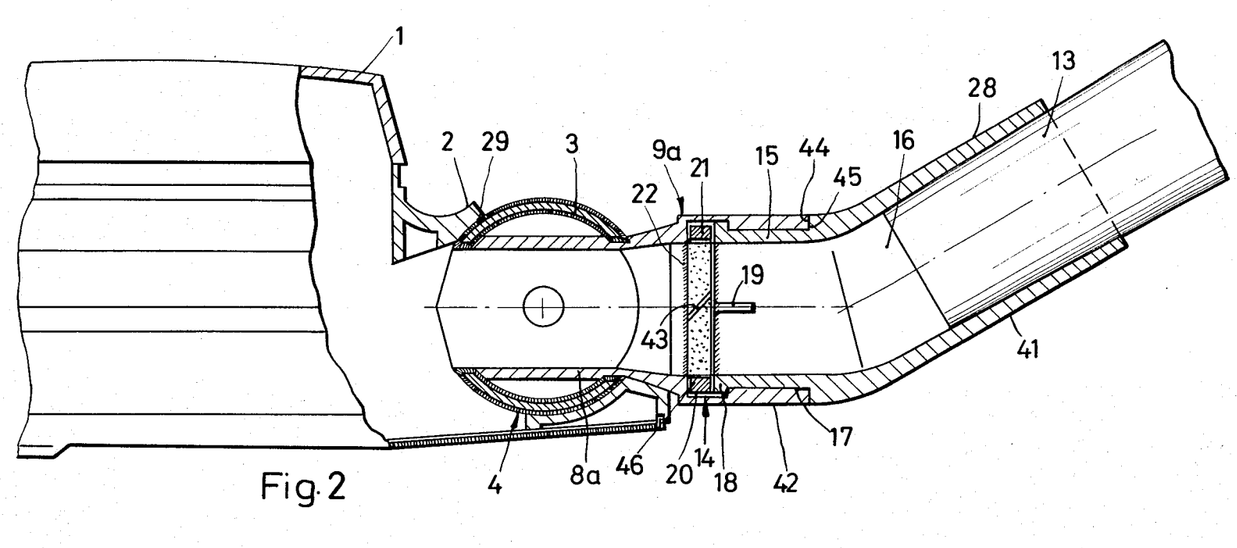
FIG. 2, in an illustration corresponding to that of FIG. 1, shows a part of a second embodiment of an apparatus according to the present invention with a tilting joint and a swivel joint.
Figure 7:
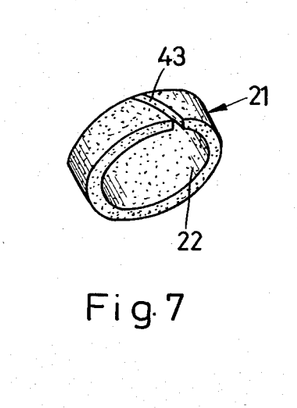
FIG. 7 shows a ring of the tilting-swivel joint according to FIG. 2 in a perspective view.

In the embodiment according to FIGS. 2 and 7, the handle 13 is connected with the suction nozzle so as to be not only pivotable via the tilting joint 4, but also to be rotatable via the swivel joint 14. The joint pan 2, the joint head 3, and the connector part 8a are constructed corresponding to the embodiments of FIGS. 1, 4 and 5.

The swivel joint 14 comprises a bearing part 18 of the connecting piece 28 which receives the handle 13, and further comprises an annular groove-like bearing recess 20 of the sleeve-shaped intermediate piece 9a. A ring 21 is arranged in the recess or annular groove 20 before the bearing part 18 in the direction of flow of the suctioned-in air flow. This ring 21 is provided completely on all sides with a fiber packing 22 (FIG. 7), and thereby prevents intrusion of dirt particles (taken along in the air flow) between the joint surfaces of the recess or annular groove 20 and the bearing part 18. The axial width of the groove or recess 20 corresponds approximately to the width of the ring 21 plus the width of the bearing part 18, so that the ring 21 is secured in the groove or recess 20 in the axial direction.

The annular groove or recess 20 is located in a cylindrical receiving part 42 of the sleeve 9a, directly adjacent to the connector part 8a, which corresponds in construction to the connector part 8 according to FIG. 1. A socket-shaped end 15 of the connecting piece 28 projects positively into a cylindrical bore 17 of the receiving part 42; the end 15 has an obtuse-angle bend transition into a longer section 41 which has a conical opening 16 for receiving the handle 13. The end 15 has a smaller outer diameter than the section 41 such that a radially extending annular shoulder 44 is formed on the outer surface against which the end face 45 of the receiving part 42 of the sleeve 9a engages, so that the sleeve 9a terminates flush with the connecting piece 28.

The ring 21 is constructed as an open ring having a separating line 43 which extends at an angle to the axis of the ring, as a result of which the ring 21 can be compressed to such an extent for insertion into the annular groove 20 that its outer diameter is smaller than the open width of the bore 17 of the receiving part 42.

Several spaced-apart slots 19 which have an open edge and are arranged one after the other in the circumferential direction, are provided on the end 15 so that also the bearing part 18, which is a radially outwardly directed edge of the end 15, can be pushed through the bore 17. The slots 19 extend from an end face 46 of the edge 18, in the axial direction of the end 15, and over at least ⅔ of the length of the end 15.

Figure 3:
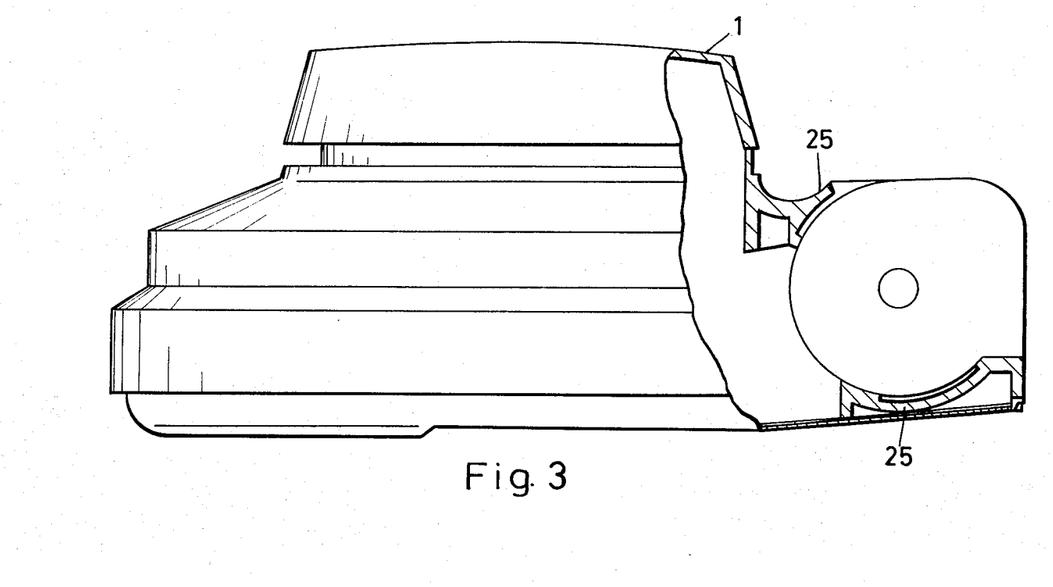
FIG. 3, partially in section and partially in an elevational view, shows a third embodiment of an apparatus according to the present invention with an apparatus housing.
Figure 8:
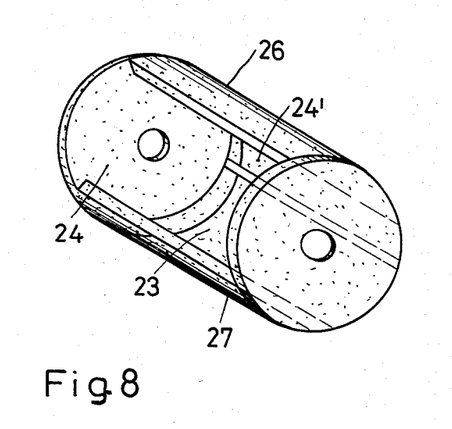
FIG. 8 is a perspective view of a joint part which is insertable in a joint pan of the apparatus housing of FIG. 3.

With the embodiment according to FIGS. 3 and 8, a drumlike joint part 26 that fits into the joint pan 25 (which is unitary with the apparatus housing 1) is pro-vided for sealing off a movement gap of the tilting joint. A joint head and a sleeve-shaped connecting piece are mounted pivotally in this joint part 26; these are constructed identical to the joint head 3 and the connecting piece 9 respectively of FIG. 1. However, the joint head which fits into the joint part 26 need not be provided with a fiber packing, because the drumlike joint part 26 is provided with a fiber packing 27. The joint part 26 of this tilting joint serves as an insert for the housing 1 or the joint pan 25, so that the joint head is pivotally mounted in this joint part 26. In the assembled relationship, the joint part 26 is held by contraction in the joint pan 25 of the apparatus housing, thus forming the sliding surface for the joint head with a cylindrical inner wall 23 (FIG. 8). The joint part 26 is provided completely on all sides with the fiber packing 27, whereby the intrusion of hard dirt particles via the suction air flow into the gap of movement between the joint part and the joint head is prevented satisfactorily. The joint part 26 has aligned openings or break-throughs 24 and 24' in conformity with the joint head 3 according to FIG. 1; these openings 24 and 24' have a rectangular outline, and essentially extend over the entire axial length of the joint part.

The present invention is, of course, in no way restricted to the specific disclosure of the specification and drawings, but also encompasses any modifications within the scope of the appended claims.

What we claim is:

1. A cleaning apparatus for a vacuum cleaner which has a handle, said apparatus comprising:
   an apparatus housing;
   a joint pan connected to said housing;
   a connecting piece detachably connected to said handle; and
   a joint head connected to said connecting piece; said joint head and said joint pan forming a joint and delimiting a gap of movement; at least one of said joint head and said joint pan being detachably connected to its associated part, and being provided at least partially with a fiber packing which projects into said movement gap and is provided with closely packed fibers which are disposed substantially at right angles on an associated support surface of said joint head or said joint pan.

2. A cleaning device according to claim 1, in which said joint head is in the shape of a drum.

3. A cleaning device according to claim 1, in which said joint head has a cylindrical wall and an insert opening which extends transverse to the axis of said cylindrical wall, said insert opening being formed by openings in said cylindrical wall, said openings extending in the direction of the axis of said cylindrical wall and approximately over the entire length of said joint head.

4. A cleaning device according to claim 3, in which said connecting piece is provided with a connector part which in turn is provided with arresting grooves, with the longitudinal edges of one of said opening in said cylindrical wall of said joint head projecting into said arresting grooves to effect said connection of said joint head to said connecting piece.

5. A cleaning device according to claim 1, in which said joint head is a part of an insert piece for said joint pan.

6. A cleaning device according to claim 1, in which said connecting piece includes a first part connected to said joint head, and a second part detachably connected to said handle, said first and second parts being pivotaly interconnected; said first part being provided with a bearing recess, and said second part having a bearing part which is a radially outwardly projecting edge thereof, said bearing part projecting into said bearing recess to effect said pivotable interconnection and to delimit therewith a gap of movement; a ring being provided in said bearing recess ahead of said bearing part as viewed from said apparatus housing in the direction toward said second part of said connecting piece; said ring being provided with a further fiber packing which is provided with closely packed fibers which are disposed substantially at right angles to a support surface of said ring.

7. A cleaning device according to claim 6, in which said joint head is part of a tilting joint; in which said first part of said connecting piece is a sleeve-shaped intermediate piece; and in which said bearing recess is an annular groove in said intermediate piece.

8. A cleaning device according to claim 7, in which said ring is an open ring of elastic material, and is radially stressed in said annular groove; and in which said ring and said bearing part are held axially fixed in said annular groove.

9. A cleaning device according to claim 8, in which said second part of said connecting piece, in the vicinity of said bearing part, is provided with at least one, approximately axially extending slot.

10. A cleaning device according to claim 9, which includes several of said slots, said slots being spaced apart one after the other in the circumferential direction.

11. A cleaning device according to claim 9, in which said joint head and said ring are surrounded on all sides by said fiber packings, which are rigidly connected with their associated part.

* * * * *